(12) United States Patent
Hatzav et al.

(10) Patent No.: US 7,821,679 B2
(45) Date of Patent: Oct. 26, 2010

(54) SYSTEM AND METHOD FOR ELECTRONICALLY COMBINING IMAGES TAKEN BY TWO OR MORE ADJACENT IMAGE SENSORS

(75) Inventors: Iuval Hatzav, Los Angeles, CA (US); Ilan Ben-Shahar, Beer-Sheva (IL); Giyora Sharaby, Moshav Neve Yarak (IL); Daniel Hatzav, Hod Hasharon (IL)

(73) Assignee: CSSN Inc, Card Scanning Solutions, Culver City, CA (US)

( * ) Notice: Subject to any disclaimer, the term of this patent is extended or adjusted under 35 U.S.C. 154(b) by 1035 days.

(21) Appl. No.: 11/552,989

(22) Filed: Oct. 26, 2006

(65) Prior Publication Data

US 2008/0212825 A1 Sep. 4, 2008

Related U.S. Application Data

(63) Continuation-in-part of application No. 10/959,261, filed on Oct. 6, 2004.

(60) Provisional application No. 60/763,455, filed on Jan. 31, 2006.

(51) Int. Cl.
*H04N 1/04* (2006.01)

(52) U.S. Cl. .................. 358/474; 358/475; 358/482; 358/404; 348/262; 382/313; 382/108

(58) Field of Classification Search ................ 358/474, 358/475, 509, 501, 404, 512–514, 530, 540, 358/450, 482, 906, 909.1, 1.15, 462; 348/262, 348/148, 218.1; 382/181, 313, 107

See application file for complete search history.

(56) References Cited

U.S. PATENT DOCUMENTS

| | | | | | |
|---|---|---|---|---|---|
| 4,709,147 | A | * | 11/1987 | Arai | 250/234 |
| 5,493,331 | A | * | 2/1996 | Takahashi et al. | 348/157 |
| 5,671,010 | A | * | 9/1997 | Shimbo et al. | 348/157 |
| 6,002,492 | A | * | 12/1999 | Kamon et al. | 358/450 |
| 6,335,755 | B1 | * | 1/2002 | McLaine et al. | 348/47 |
| 6,597,401 | B1 | * | 7/2003 | Maruyama | 348/335 |
| 7,154,641 | B2 | * | 12/2006 | Ichikawa | 358/483 |
| 7,154,642 | B2 | * | 12/2006 | Lichtfuss | 358/497 |
| 7,586,655 | B1 | * | 9/2009 | Uhlik et al. | 358/497 |
| 2002/0030861 | A1 | * | 3/2002 | Ichikawa | 358/505 |
| 2002/0118402 | A1 | * | 8/2002 | Shaw et al. | 358/474 |
| 2002/0141002 | A1 | * | 10/2002 | Takano et al. | 358/513 |
| 2005/0140991 | A1 | * | 6/2005 | Ogiwara et al. | 358/1.2 |
| 2006/0226380 | A1 | * | 10/2006 | Koike et al. | 250/559.06 |
| 2007/0268118 | A1 | * | 11/2007 | Watanabe et al. | 340/435 |
| 2008/0143835 | A1 | * | 6/2008 | Abe et al. | 348/148 |
| 2008/0212825 | A1 | * | 9/2008 | Hatzav et al. | 382/100 |
| 2008/0309774 | A1 | * | 12/2008 | Beng Goh et al. | 348/218.1 |
| 2009/0219580 | A1 | * | 9/2009 | Cornell et al. | 358/474 |

* cited by examiner

*Primary Examiner*—Negussie Worku

(57) ABSTRACT

A camera system for imaging a document, the camera system including at least 2 adjacently disposed image sensors with coupling optics. The adjacently disposed image sensors are configured to acquire respective image frames of at least a portion of the document, thereby obtaining a set of corresponding two-dimensional image frames. The system further includes a processor for processing the corresponding two-dimensional image frames. The processor is facilitated to combine the corresponding two-dimensional image frames into a single image frame.

13 Claims, 8 Drawing Sheets

US 7,821,679 B2

SYSTEM AND METHOD FOR ELECTRONICALLY COMBINING IMAGES TAKEN BY TWO OR MORE ADJACENT IMAGE SENSORS

CROSS-REFERENCE TO RELATED APPLICATIONS

This application is a continuation-in-part of application Ser. No. 10/959,261, filed Oct. 6, 2004, which is incorporated by reference in its entirety herein. This application is related to the following U.S. patent applications:

"System and method for scanning a business card from within ms outlook directly into the ms outlook contact file", application Ser. No. 11/307,943 filed Feb. 28, 2006; and "System and method for creating a visitor badge for a conference or exhibition from a scanned ID or smart card document," application No. 60/763,455 filed Jan. 31, 2006.

The disclosures of the above applications are incorporated herein by reference.

FIELD OF THE INVENTION

The present invention relates to wide angle cameras, and more particularly to cameras capable of electronically combining images taken by two or more adjacent wide angle cameras.

BACKGROUND OF THE INVENTION

There exist in today's market scanning devices capable of reading ID cards, drivers license, business cards etc. these scanners are characterized in their low cost and small size. On the other hand they suffer from long scanning time and a relative short MTBF due to the high amortization rate of their internal mechanisms. ScanShell 800 is an example of such a device.

One approach to try and solve the problems raised is to use an ordinary CMOS camera 10, as illustrated in FIG. 1. But a CMOS camera 10 with high enough resolution is relative expensive and large in size. Otherwise, with the appropriate electronics 20 and memory 30, the image data would have been flowing to computer 99 via a fast enough interface 90 such as USB.

It is then desirable to provide devices that can maintain low cost and small size and provide for a quick scanning rate, low amortization rate and without compromising on the size of the scanned document.

SUMMARY OF THE INVENTION

In view of the limitations now present in the prior art, the present invention provides new and useful scanning devices that can maintain low cost and small size and provide for a quick scanning rate, low amortization rate and without compromising on the size of the scanned document.

In view of the deficiencies of the prior art system illustrated in FIG. 1, the object of the present invention is then to provide a system that can use CMOS technology but still keep the size small and the cost low. Hence, the present invention provides a system that uses two or more CMOS chips, each of low cost and that acquires an image of at least part of the scanned document such that there is no gap between adjacent images but rather some overlap. Special algorithms implemented in hardware/firmware/software combination combine the images into one image of said scanned document. The image is then transferred to the computer for data extraction.

An aspect of the present invention to provide a system that can accurately align two adjacent images while correcting for radial, scale, rotation, translation and other linear or nonlinear deformations.

An aspect of the present invention to provide a system that acquires images from a closer range and with better efficiency with respect to document area coverage.

An aspect of the present invention is to provide a system capable of preventing illumination hot spots.

According to the teachings of the present invention, a system for fast scanning documents is provided which includes two or more CMOS cameras, electronics for combining adjacent images into one, while optionally correcting for radial, scale, rotation, translation and other linear or nonlinear deformations, and communication means that can transfer the combined image to a computer for data analysis. Said electronics includes memory.

These and other advantages of the present invention will become apparent upon reading the following detailed descriptions and studying the various figures of the drawings.

BRIEF DESCRIPTION OF THE DRAWINGS

The present invention will become fully understood from the detailed description given herein below and the accompanying drawings, which are given by way of illustration and example only and thus not limitative of the present invention, and wherein.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

The main object of the present invention is then to provide new and useful scanning devices that can maintain low cost and small size and provide for a quick scanning rate and low amortization rate, and without compromising on the size of the scanned document.

Figure 1:
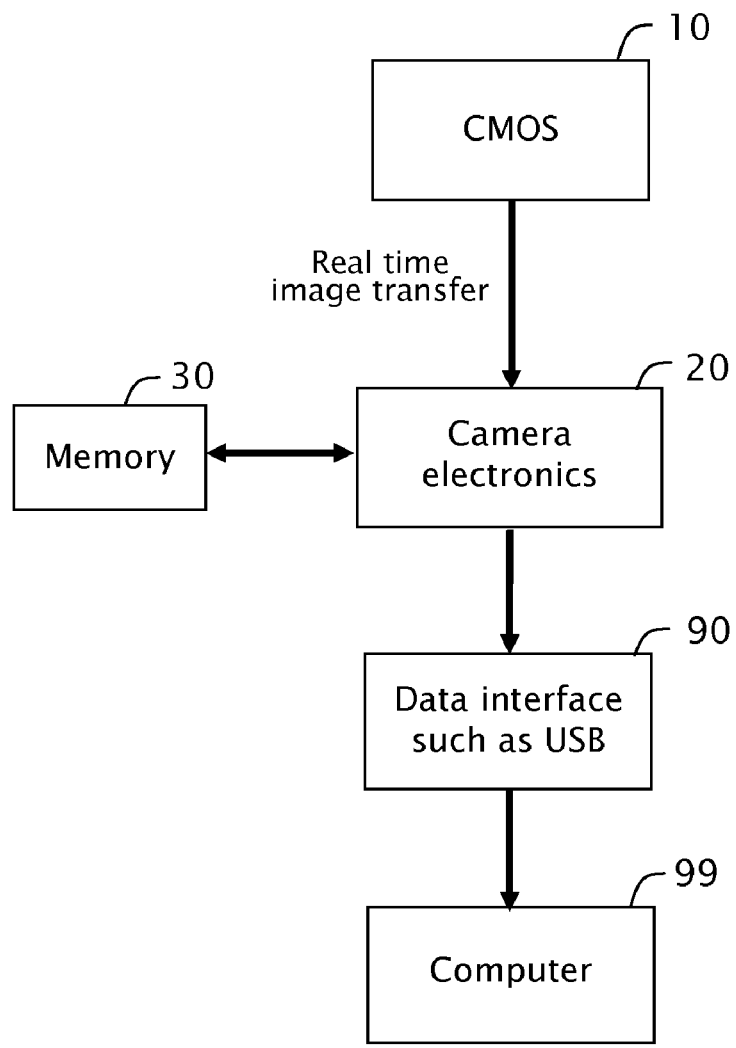
FIG. 1 is a schematic block diagram of the system of a problematic solution for a fast document scanner.
Figure 3:
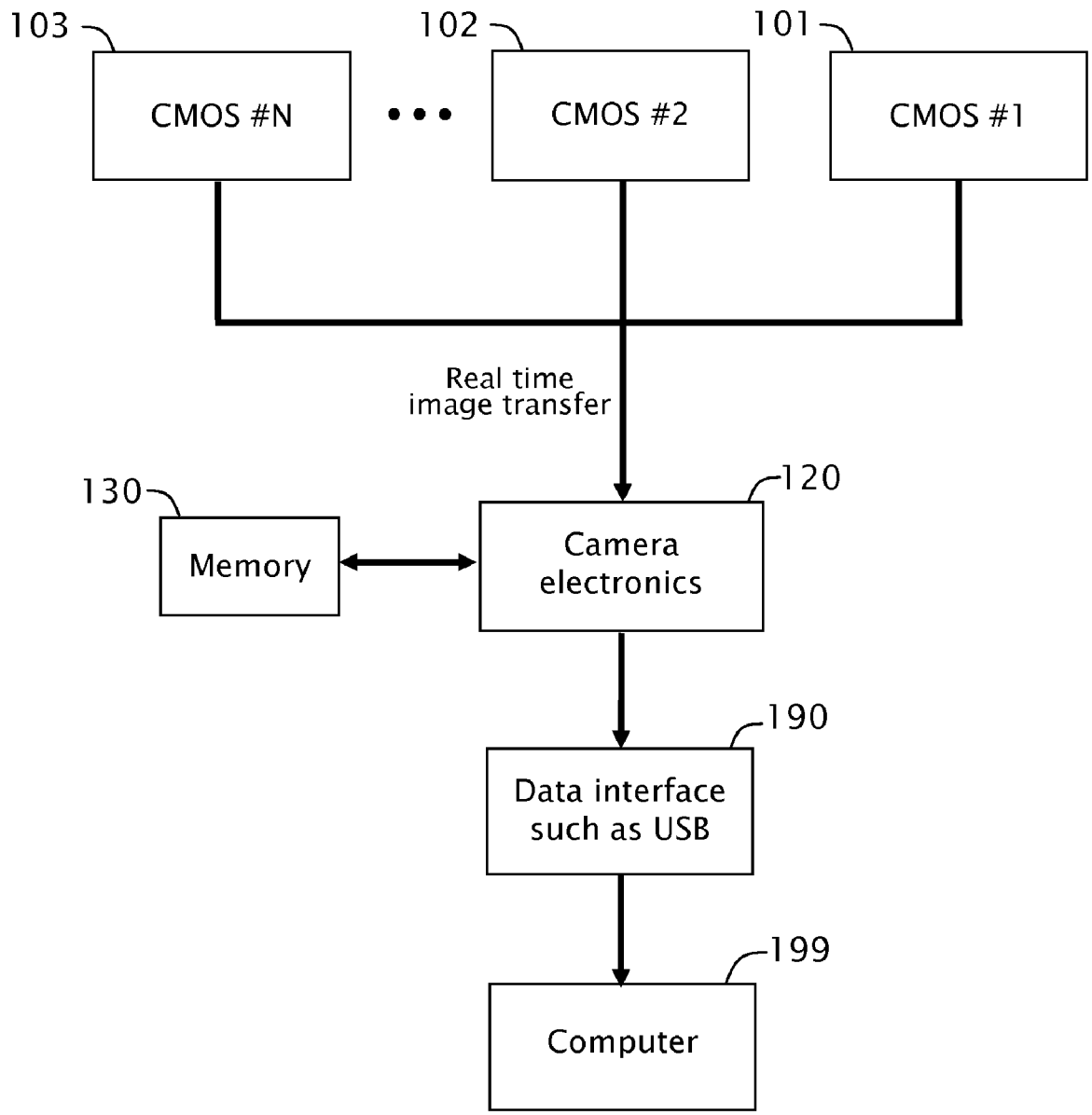
FIG. 3 is a schematic block diagram of the system according with the present invention.

FIG. 3 shows a schematic block diagram of the system according with the present invention. Instead of a single high cost, high resolution CMOS camera 10, as shown in FIG. 1, two or more lower resolution CMOS cameras 101, 102 and optionally more CMOS cameras 103 are used to cover at least parts of the scanned document 1, such that all images combined cover the whole document 1. If, for example, we need an X Mpixels CMOS camera 10 in the configuration of FIG. 1, then in a 2 CMOS cameras 101 and 102 configuration, each of them needs to be X/2 Mpixels cameras. This, usually, reduces the cameras cost substantially.

Also, the optics needed to cover a document area for the CMOS camera 10 in the configuration of FIG. 1, is much more scarce and large in size, than the optics needed for both CMOS cameras 101 and 102. Another advantage of the configuration presented in FIG. 3 over that of FIG. 1 is coverage efficiency.

Figure 2:
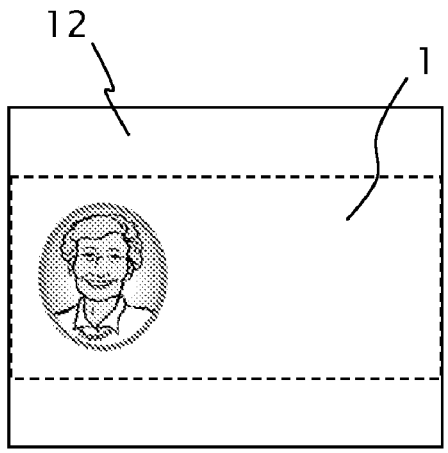
FIG. 2 shows the coverage efficiency of the system in FIG. 1.
Figure 4:
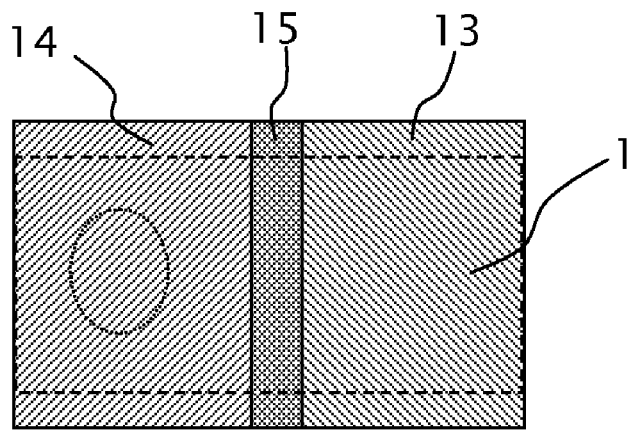
FIG. 4 shows the coverage efficiency of an example system, comprising two CMOS cameras according to an embodiment of the present invention.

For example: if we take 3 Mpixels CMOS camera 10 as in the configuration of FIG. 1, the best available optics produce a 60% coverage efficiency of a California driving license, as illustrated in FIG. 2, and the image acquired is of 3 Mpixels resolution. Taking now two 2 Mpixels CMOS cameras 101 and 102, as in the configuration of FIG. 3, the available optics produce a 68% coverage efficiency of the same document 1, as in the configuration of FIG. 4, in spite of some overlap between the images, and the image acquired is of 4 Mpixels resolution. In this example, the focal length of the 3 Mpixels CMOS camera 10 requires imaging distance of 12 cm while in the other cameras the distance is shortened to 6 cm only. These distances define the device size.

In order to shorten the distance from the camera lens to the document, wide angle lenses are used. Such lenses, which have numerical aperture of 100°-130°, exist but they suffer from a high level of distortions (5%-10%). In any case it is highly recommended to correct distortions and deformations caused by the wide angle lenses and camera misalignment.

In the preferred embodiment of this invention the following corrections are applied to each pair of images before combining them into one image:

a) Lens and scale distortions (linear and nonlinear);
b) Rotational misalignments;
c) Translational misalignments; and
d) Cutting along a straight line.

Figure 5:
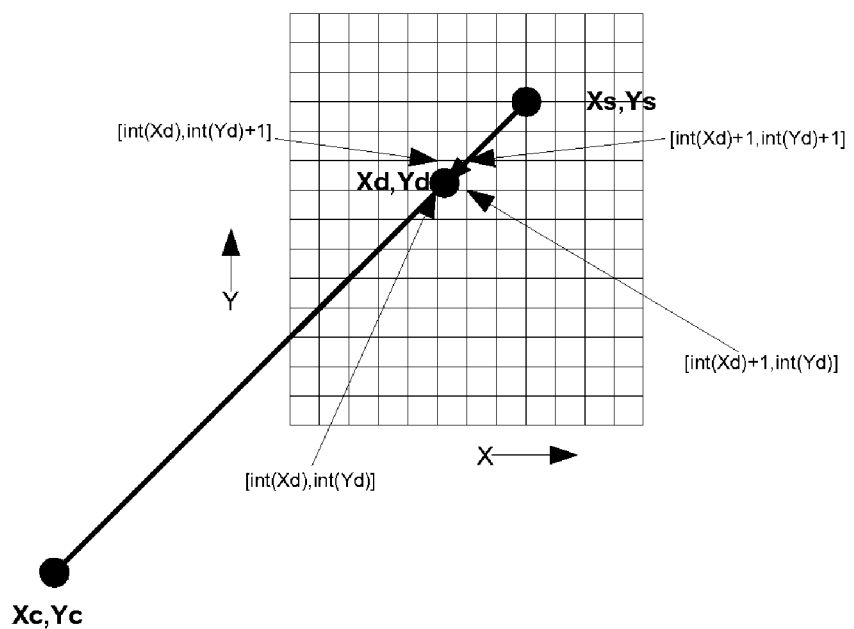
FIG. 5 describes the function for correcting radial deformations according to an embodiment of the present invention.

Lens radial distortion are corrected as shown in FIG. 5, according with the following function:

$$r_d = r_s(1 + k_1 r_s^2 + k_2 r_s^4 + k_3 r_s^6 \ldots) \quad (1)$$

or $$x_d = x_s(1 + k_1 r_s^2 + k_2 r_s^4 + k_3 r_s^6 \ldots) \quad (2)$$

$$y_d = y_s(1 + k_1 r_s^2 + k_2 r_s^4 + k_3 r_s^6 \ldots) \quad (3)$$

where $r_s^2 = (x_s^2 + y_s^2)$. It should be noted the optical distortion is fixed per each individual system and needs to be measured only once in a system lifetime to derive its optical correction equation.

Method of correction: each pixel $(X_i, Y_i)$ in the non-distorted image has a corresponding point $(X_d, Y_d)$ in the distorted image, with 4 consequent matching points in the distorted image $(P_1, P_2, P_3, P_4)$:

[int($X_d$),int($Y_d$)],[int($X_d$)+1,int($Y_d$)],[int($X_d$),int($Y_d$)+1],[int($X_d$)+1,int($Y_d$)+1].

Figure 6:
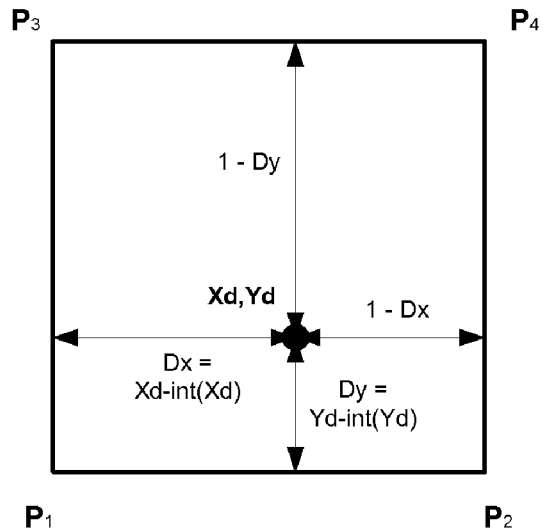
FIG. 6 describes the method of correcting scale and radial deformation according to an embodiment of the present invention.

These 4 points have corresponding (R, G, B) values, whereas the (R, G, B) value at point $(X_s, Y_s)$ are computed, for example, by a Bi Cubic Interpolation, according to the following function:

$$P_s = P_1(1-dx)\cdot(1-dy) + P_2 dx\cdot(1-dy) + P_3(1-dx)\cdot dy + P_4 dx\cdot dy \quad (4)$$

as illustrated in FIG. 6. For the sake of clarity, any other interpolation computation can be used.

Figure 7:
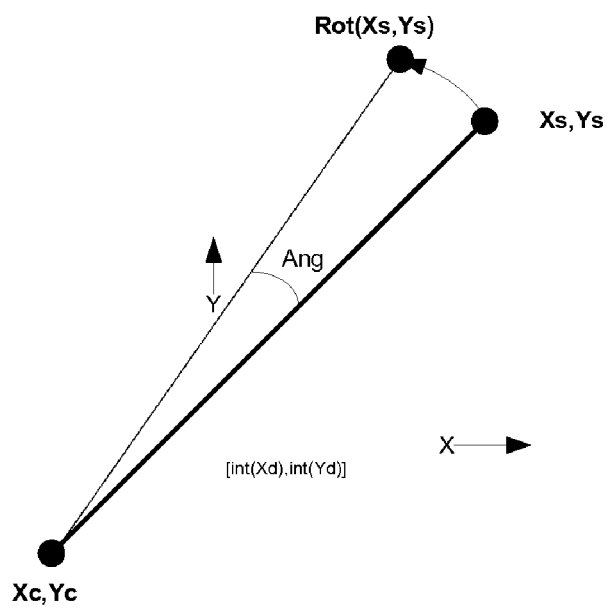
FIG. 7 describes the function for correcting for rotation distortion according to an embodiment of the present invention.

Next, rotational and translational misalignments are corrected, as shown in FIG. 7, according with the following function:

$$Rot[x_s, y_s] = [x_s, y_s] \begin{bmatrix} \cos(\theta) & -\sin(\theta) \\ \sin(\theta) & \cos(\theta) \end{bmatrix} \quad (5)$$

In practice, given any point coordination $(X_s, Y_s)$, a rotational correction is applied to it by a matrix multiplication, then the distortion point is computed followed by, for example, a Bi Cubic Interpolation, in order to obtain its (R, G, B) values.

After distortion corrections of corresponding two images from each pair of cameras, the overlapping parts of the images are found by correlation or convolution or any other operation known in the art. The images are cut along a line, preferably a straight line, and are concatenated along that line into one image.

Figure 8A:
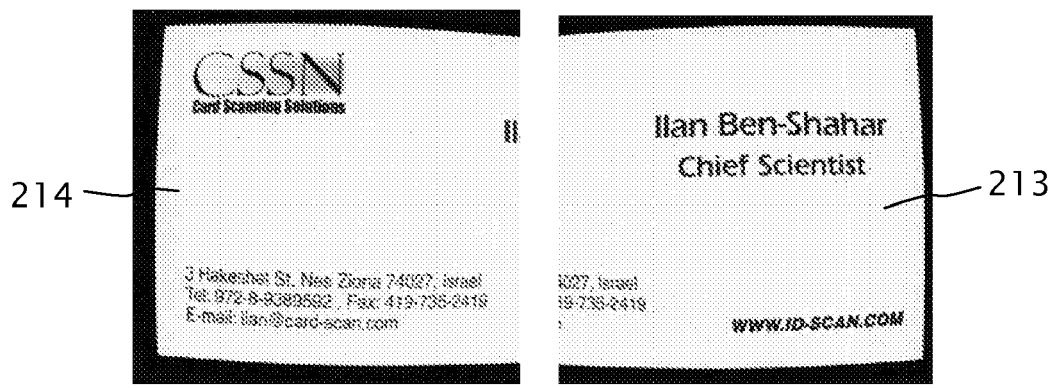
FIG. 8 depicts an example of correcting radial, scale, rotation and translation deformations, and unifying overlapping images taken from two cameras, according to an embodiment of the present invention.
Figure 8B:

FIG. 8 exemplifies the correction and concatenation process. FIG. 8a shows two raw, distorted adjacent images 213 and 214 of a scanned business card 1. Images 213 and 214 contain radial distortions caused by the lens and a slight translational and rotational misalignment. Measuring the optical parameters yield the following optical distortion equation:

$$r_d = r_s(1 + 0.05 r_s^2) \quad (6)$$

for both cameras.

Figure 8C:
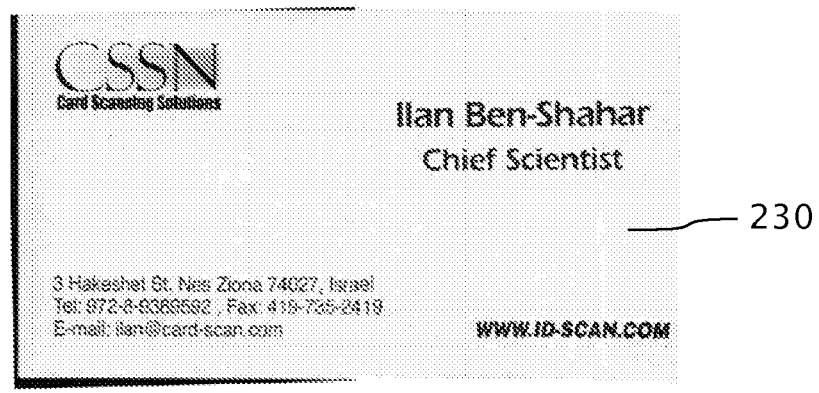

The extracted rotational data is −0.9° for the right image 213 and +1.7° for the left image 214. Correction yields images 223 and 224 correspondingly, depicted in FIG. 8b. FIG. 8c depicts the final concatenated image 230 after unifying the overlapping parts and which is transferred to the computer 199 for data analysis.

Figure 9:
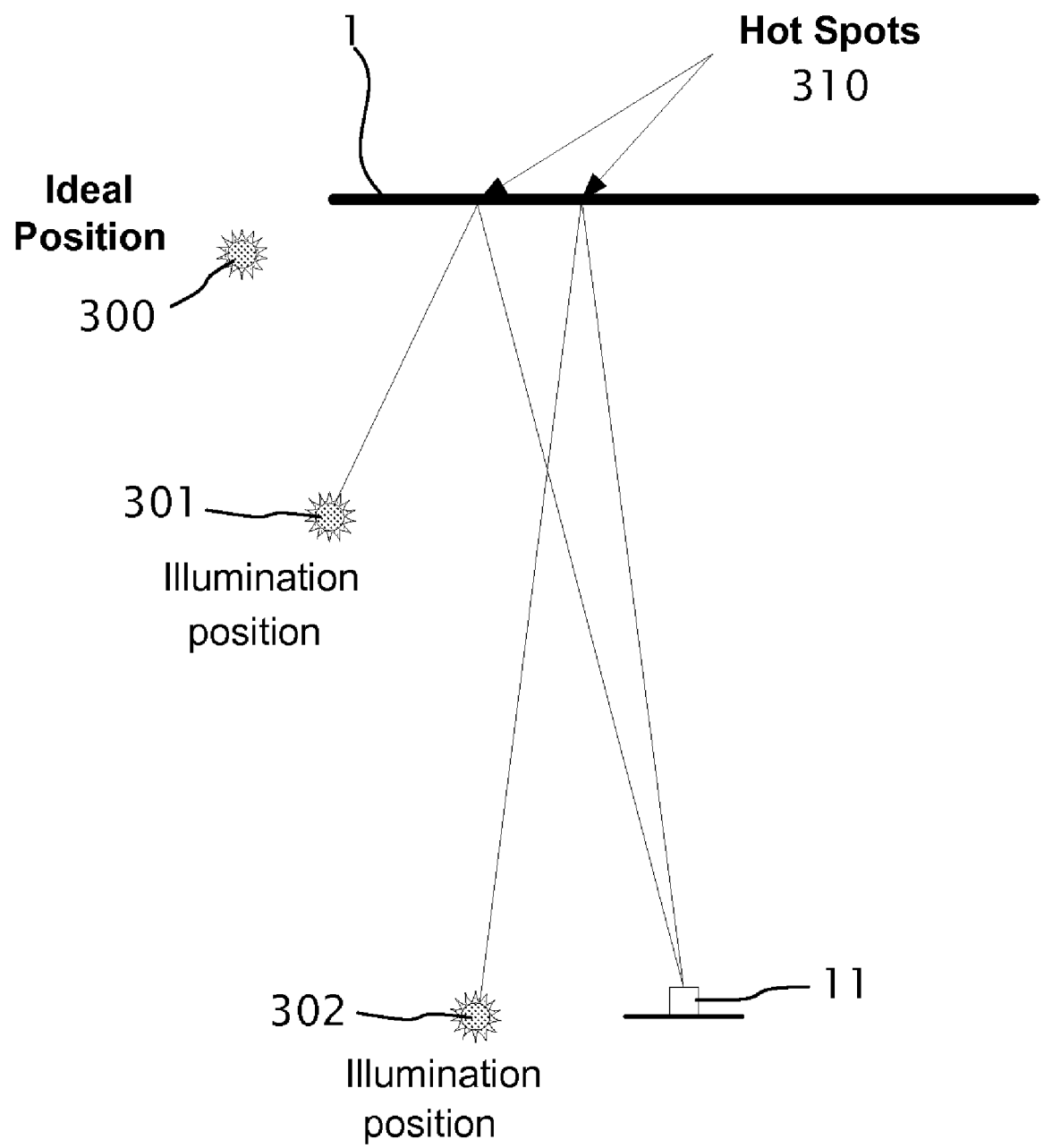
FIG. 9 illustrates the hot spot problem caused by direct illumination of the scanned document.

When imaging a document 1 with a camera 11, the document needs to be illuminated. In conventional illumination method, as depicted in FIG. 9, illumination positions 301 and 302 enable the return of the majority of light to the camera 11 lens but give rise to a problem known in the art as hot spot 310, where light source itself is imaged by the camera 11. If illumination position 300 is taken, with a low incident angle, the problem is avoided but most of the illumination generated by the light source is lost.

Figure 10:
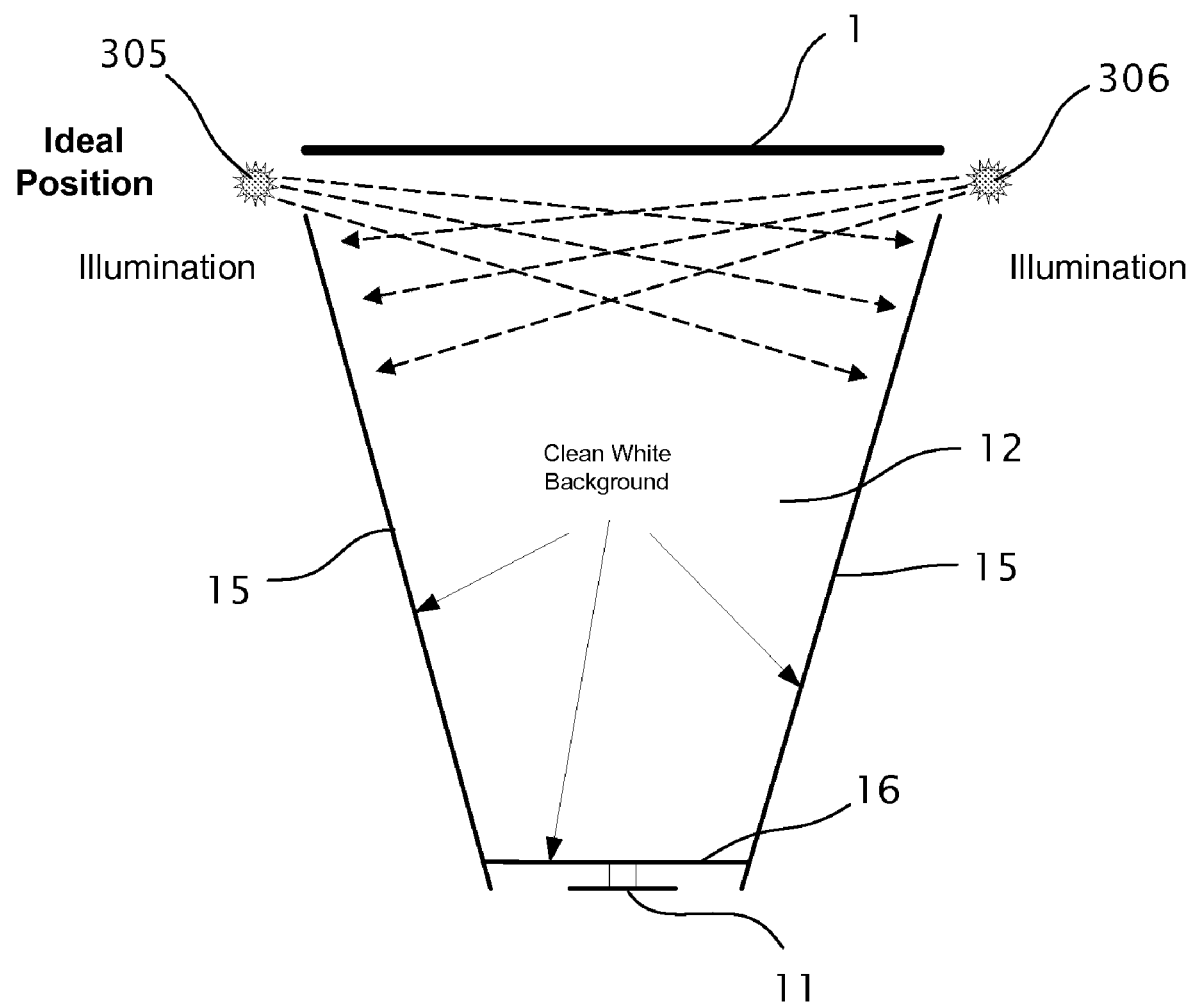
FIG. 10 illustrates a hot spot problem solution, according with an embodiment of present invention.
Figure 11:
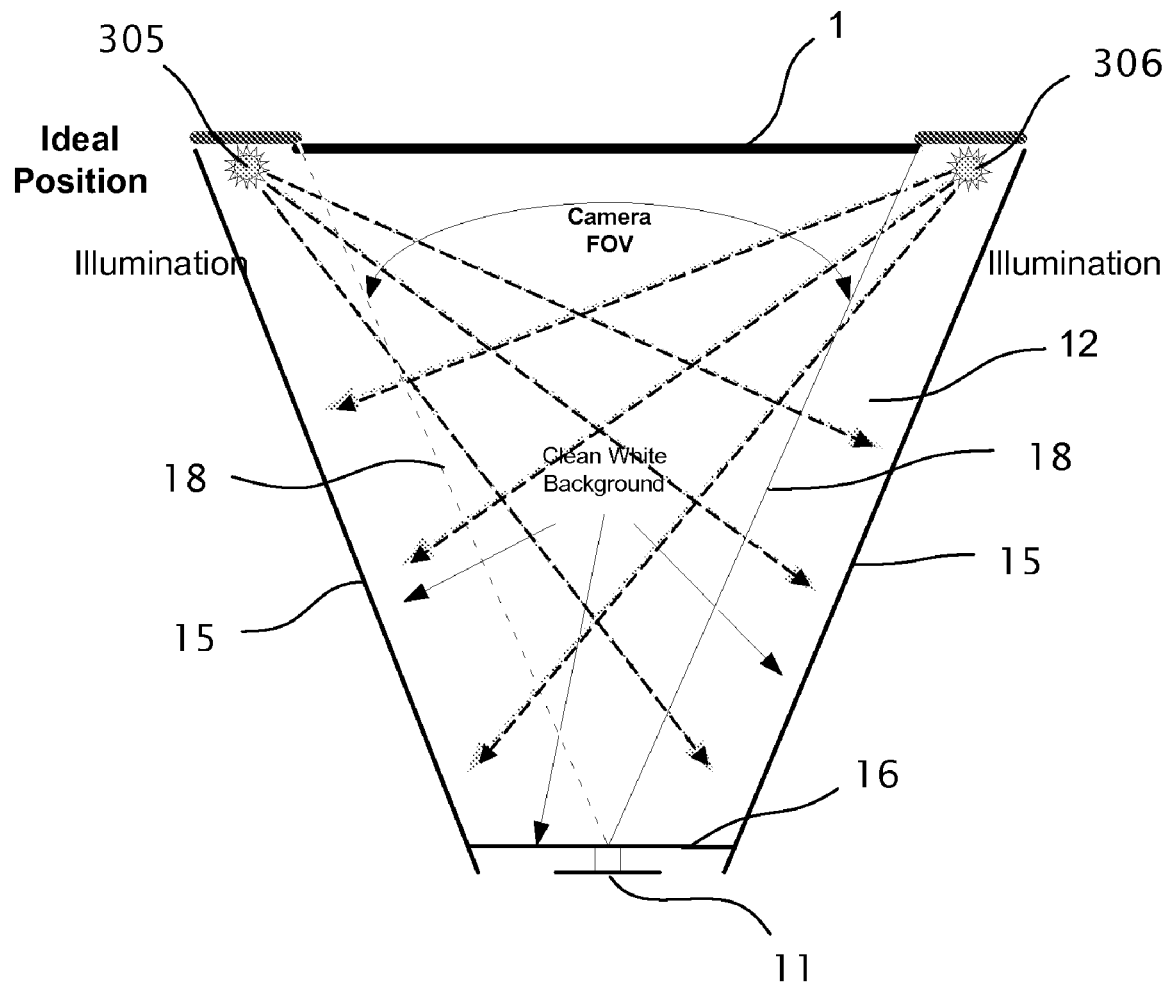
FIG. 11 illustrates a hot spot problem solution, according with the preferred embodiment of present invention.

FIG. 10 and FIG. 11 illustrate hot spot 310 problem solutions, according with the preferred embodiment of present invention. In this embodiment, one or more light sources 305 and/or 306 are directed towards reflecting walls 15 and 16 which form a cell 12, whereas all the rays that bounce of the walls 15 and 16 create a uniform white illumination inside the cell 12, which illuminate the document 1 with no hot spot effects. The one or more light sources 305 and/or 306 are positioned such that they are out of the range of the camera field of view (FOV) 18.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A camera system for imaging a document comprising:
   a) a digital camera comprising:
      i) at least 2 adjacently disposed image sensors; and
      ii) coupling optics,
   wherein said adjacently disposed image sensors are configured to acquire respective image frames of at least a portion of the document, thereby obtaining a set of corresponding image frames;
   b) memory to store said respective image frames; and
   c) a processor for processing said set of corresponding image frames, wherein said processor is facilitated to combine said corresponding image frames into a single image frame,
   wherein each of said corresponding image frames covers a substantially different portion of the document;
   wherein no gap is formed between adjacent image frames of said set of corresponding image frames; and
   wherein said single image frame covers substantially the whole of the document.

2. A system as in claim 1, wherein said coupling optics includes a wide angle lens coupled to each of said image sensors.

3. A system as in claim 1, wherein said processor is further facilitated to perform correction of said corresponding image frames to compensate for at least one image deformation, before said combining of said corresponding image frames into said single image frame.

4. A system as in claim 1, whereas said processor is further facilitated to perform unification of overlapping image portions of said adjacent image frames.

5. A system as in claim 4, whereas said unifying of said overlapping image portions is performed along a straight line.

6. A system as in claim 1 further comprising at least one light source for illuminating the document, wherein said document illumination is uniform and facilitated to prevent hot spots.

7. A system as in claim 1, wherein said at least 2 adjacently disposed image sensors are CMOS image sensors.

8. A system as in claim 1, wherein the area of said overlapping image portions is nil.

9. In a camera system having, at least two adjacently disposed two-dimensional image sensor arrays, wherein each of the image sensor arrays is facilitated to acquire at least one two-dimensional image frame of at least a portion of a document, a method for combining adjacent image frames of the document into a single image, comprising the steps of:
   a) simultaneously acquiring an image frame by each of said image sensors, thereby obtaining a set of corresponding image frames; and
   b) combining said set of corresponding image frames into a single image frame by use of a processor,
   wherein each of said corresponding image frames covers a substantially different portion of the document;
   wherein no gap is formed between adjacent image frames of said set of corresponding image frames; and
   wherein said single image frame covers substantially the whole of the document.

10. A method as in claim 9 further comprising a step of correcting at least one of said corresponding image frames, to compensate for at least one image deformation, before said combining of said set of corresponding image frames into a single image frame.

11. A method as in claim 10, wherein said at least one image deformation is selected from the group consisting of rotational deformation, translational deformation, scale deformation and radial deformation.

12. A method as in claim 9 further comprising a step of unifying overlapping image portions of adjacent image frames of said corresponding two-dimensional image frames, before said combining of said corresponding two-dimensional image frames into a single image frame.

13. A method as in claim 12, wherein said unifying of said overlapping image portions is performed along a straight line.

* * * * *